US009365178B2

(12) United States Patent
Kang

(10) Patent No.: US 9,365,178 B2
(45) Date of Patent: Jun. 14, 2016

(54) DEVICE FOR PROTECTING PASSENGER OF VEHICLE

(71) Applicant: HYUNDAI MOBIS Co., Ltd., Yongin-si, Gyeonggi-do (KR)

(72) Inventor: Jeong Hoon Kang, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 50 days.

(21) Appl. No.: 14/325,456

(22) Filed: Jul. 8, 2014

(65) Prior Publication Data

US 2015/0014967 A1 Jan. 15, 2015

(30) Foreign Application Priority Data

Jul. 9, 2013 (KR) .................. 10-2013-0080496
Jul. 2, 2014 (KR) .................. 10-2014-0082590

(51) Int. Cl.
*B60R 21/205* (2011.01)
*B60R 21/233* (2006.01)
*B60R 21/231* (2011.01)
*B60R 21/00* (2006.01)

(52) U.S. Cl.
CPC ....... *B60R 21/205* (2013.01); *B60R 2021/0023* (2013.01); *B60R 2021/0048* (2013.01); *B60R 2021/23107* (2013.01)

(58) Field of Classification Search
CPC ............... B60R 2021/0023; B60R 21/205; B60R 2021/23107; B60R 21/233; B60R 21/231
USPC ....................... 280/729, 730.1, 732
See application file for complete search history.

(56) References Cited

U.S. PATENT DOCUMENTS

| | | | | |
|---|---|---|---|---|
| 3,801,126 A * | 4/1974 | Knight, IV | ............ | B60R 21/205 180/90 |
| 5,575,497 A * | 11/1996 | Suyama | ................ | B60R 21/231 280/730.1 |
| 6,073,960 A * | 6/2000 | Viano | ................... | B60R 21/231 280/730.1 |
| 8,297,648 B2 * | 10/2012 | Komoll | ................. | B60R 21/231 280/729 |
| 8,998,250 B2 * | 4/2015 | Kruse | ................... | B60R 21/232 280/729 |
| 9,108,588 B2 * | 8/2015 | Fukawatase | .......... | B60R 21/233 |
| 9,180,834 B1 * | 11/2015 | Le | ......... | B60R 21/231 |
| 2002/0089152 A1 * | 7/2002 | Khoudari | ............. | B60R 21/231 280/728.2 |
| 2004/0026909 A1 * | 2/2004 | Rensinghoff | ......... | B60R 21/231 280/732 |
| 2005/0035577 A1 * | 2/2005 | Barko | ..................... | B60R 21/33 280/730.2 |
| 2005/0275199 A1 * | 12/2005 | Helmstetter | .......... | B60R 21/231 280/730.1 |
| 2005/0275201 A1 * | 12/2005 | Schneider | ............. | B60R 21/231 280/731 |
| 2006/0163848 A1 * | 7/2006 | Abe | ...................... | B60R 21/231 280/729 |
| 2006/0197324 A1 * | 9/2006 | Klinkenberger | ...... | B60R 21/203 280/731 |
| 2008/0129023 A1 * | 6/2008 | Heigl | .................... | B60R 21/232 280/730.1 |
| 2014/0203541 A1 * | 7/2014 | Wei | ...................... | B60R 21/213 280/730.1 |

* cited by examiner

*Primary Examiner* — Ruth Ilan
(74) *Attorney, Agent, or Firm* — Paratus Law Group, PLLC

(57) ABSTRACT

Present invention relates to a device for protecting a passenger of a vehicle which includes curtain air bag (CAB) modules disposed at left and right sides of a roof panel inside the vehicle, a driver air bag (DAB) module disposed at a steering wheel inside the vehicle, and an eccentric impact preventing air bag module disposed to be unfolded toward an A-pillar disposed so as to divide a windshield glass disposed at a front side of the vehicle and side doors disposed at lateral sides of the vehicle, thereby effectively protects a driver seat passenger even when an unexpected front collision accident of a vehicle occurs.

11 Claims, 11 Drawing Sheets

*-Prior Art-*

DEVICE FOR PROTECTING PASSENGER OF VEHICLE

CROSS-REFERENCE TO RELATED APPLICATIONS

The present application claims priority to Korean Patent Application No. 10-2013-0080496 filed Jul. 9, 2013 and 10-2014-0082590, filed Jul. 2, 2014, the entire contents of which the application is incorporated herein for all purposes by this reference.

TECHNICAL FIELD

The present invention relates to a device for protecting a passenger of a vehicle, and more particularly, to a device for protecting a passenger of a vehicle, which is capable of effectively protecting a head of a driver eccentrically moving due to an eccentric collision of a vehicle in a direction in which an A-pillar between an air bag module of a driver's seat and a curtain air bag module is provided.

BACKGROUND

In general, various air bag modules are installed in a vehicle so as to safely protect a driver and a passenger from impact force according to a collision when of a collision accident of a vehicle is generated during travel.

The air bag modules may be divided into a driver air bag (DAB) module installed at a steering wheel of a vehicle to protect a driver, a passenger air bag (PAB) module installed at a dashboard panel in a front direction of a passenger to protect a passenger on a passenger's seat, a seat air bag (SAB) module installed at each seat of a vehicle to protect passengers from side impact, and a curtain air bag (CAB) module installed inside a roof trim corresponding to a space between a roof panel inside a vehicle and each side door to generally protect the side area of the passengers, according to the type thereof.

FIG. 1 is a conceptual diagram illustrating an example of a collision accident of a vehicle, and FIG. 2 is a conceptual diagram illustrating a movement of a driver seat passenger (driver) and unfolded states of various air bag modules while the collision accident occurs according to FIG. 1.

In a device for protecting a passenger of a vehicle according to the related art, various air bag modules are configured to be automatically unfolded when a predetermined level or more of impact is detected, and particularly, a driver air bag module is configured to be appropriate to protect a driver moving in a straight front direction of the vehicle.

However, the device for protecting a passenger of a vehicle according to the related art has a problem in that when a running vehicle 10A does not have an actual head-on collision with an oncoming vehicle 10B or a specific object (including a stopped object, such as a guard rail on a road), but is eccentric to one side and collides with an impacted object while overlapping the impacted object by a predetermined length as illustrated in FIG. 1, a driver 30 seated in a driver seat 20 eccentrically moves toward an A-pillar positioned between a DAB module 70 and a CAB module 80 as illustrated in FIG. 2, so that a blind spot of safety, in which a head of the driver 30 cannot be protected, is created.

In order to solve the aforementioned problem, an air bag cushion of the DAB module 70 is designed so as to be unfolded toward the A-pillar 60, but in this case, when an actual head-on collision, not an eccentric collision, occurs, expansion force for protecting the driver 30 is lost by a design value toward the A-pillar 60, so that it is difficult to safely protect the driver 30.

Non-described reference numeral 40 refers to a windshield glass configuring a front side of the vehicle, and non-described reference numeral 50 refers to a roof panel configuring an upper side of the vehicle.

SUMMARY

The present invention has been made in an effort to provide a device for protecting a passenger of a vehicle, which includes an eccentric impact preventing air bag module capable of effectively protecting a driver when a vehicle eccentrically collides with an impacted object while overlapping the impacted object by a predetermined distance.

Objects of the present invention are not limited to the objects described above, and other objects that are not described will be clearly understood by a person skilled in the art from the description below.

An exemplary embodiment of the present invention provides a device for protecting a passenger of a vehicle, including: curtain air bag (CAB) modules disposed at left and right sides of a roof panel inside the vehicle; a driver air bag (DAB) module disposed at a steering wheel inside the vehicle; and an eccentric impact preventing air bag module disposed to be unfolded toward an A-pillar disposed so as to divide a windshield glass disposed at a front side of the vehicle and side doors disposed at lateral sides of the vehicle.

The eccentric impact preventing air bag module may be disposed between the DAB module and the windshield glass.

The eccentric impact preventing air bag module may include: an air bag cushion filled with gas, and unfolded between the DAB module and the windshield glass; and a cluster housing positioned between the DAB module and the windshield glass to provide an installation place of an indicator dial of the vehicle and an installation place of the air bag cushion.

A tear line torn by unfolding force of the air bag cushion to induce unfolding of the air bag cushion may be formed in the cluster housing.

The tear line may be formed so that the air bag cushion is unfolded in a direction in which the side door adjacent to a driver seat based on the cluster housing is provided.

A center of an upper end of the cluster housing may protrude in an upper direction to be rounded, and the tear line may be formed in a direction in which the side door adjacent to a driver seat based on a center of an upper end of the cluster housing is provided, and may be formed in a shape of "⊏" opened toward the center of the upper end of the cluster housing.

The eccentric impact preventing air bag module may include: an air bag cushion filled with gas, and unfolded between the DAB module and the windshield glass; and an air bag housing in which the air bag cushion is accommodated, and the air bag housing may be fixed to an upper side of the cluster housing, in which an indicator dial of the vehicle is installed, and then hidden by a dashboard panel covering the cluster housing.

A cowl cross bar may be horizontally elongated and disposed at the front side of the driver seat in the vehicle so as to support the cluster housing and the dashboard panel, and the eccentric impact preventing air bag module may be coupled to a front upper portion of the cluster housing through a first bracket fixed to the cowl cross bar and a second bracket supported by the first bracket.

One end of the first bracket may be fixed to the cowl cross bar, and the other end of the first bracket may be extended so as to surround a part of a front portion of the cluster housing to be fixed to the dashboard panel.

One end of the second bracket may be supported by the first bracket, and the other end of the second bracket may be bolt-coupled with the air bag housing.

A tear line torn by unfolding force of the air bag cushion to induce unfolding of the air bag cushion may be formed in the dashboard panel.

The tear line may be formed so that the air bag cushion is unfolded in a direction in which the side door adjacent to a driver seat based on the cluster housing is provided.

The tear line may be formed in the dashboard panel in a shape of "⊏" opened in a direction opposite to an unfolding direction of the air bag cushion.

The air bag cushion may be unfolded so as to cover a part of the A-pillar when filled with gas.

The air bag cushion may be unfolded so as to cover a part of the A-pillar when filled with gas.

The air bag cushion may be unfolded so as to cover a lower part of the A-pillar when filled with gas.

The air bag cushion may have: a front part configuring a front portion so as to be in direct contact with the A-pillar after the unfolding; and a rear part configuring a rear portion so as to be in direct contact with a head of a driver after the unfolding, and border portions of the front part and the rear part may be sewn and coupled with each other.

The air bag cushion may be formed to have a longest length of the front part larger than a longest length of the rear part.

According to the device for protecting a passenger of the vehicle according to the present invention, it is possible to effectively protect a driver by the DAB module when a front collision accident of the vehicle is an actual front collision accident, and effectively protect a driver by the eccentric impact preventing air bag module when a front collision accident of the vehicle is an eccentric collision in which the colliding vehicles overlap by a predetermined distance in a horizontal direction, thereby protecting a life of the driver from a safety accident.

The effects of the present invention are not limited to the effects described above, and a person of ordinary skill in the art will clearly understand other effects that are not described from the description of the scope of the claims.

DETAILED DESCRIPTION

Hereinafter, exemplary embodiments of a device for protecting a passenger of a vehicle according to the present invention will be described in detail with reference to the accompanying drawings.

Figure 1:
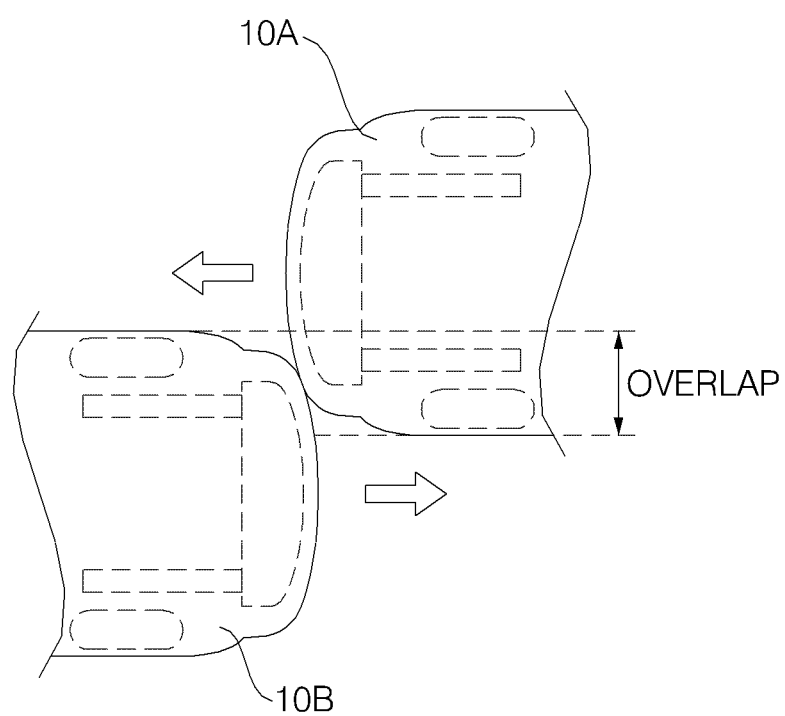
FIG. 1 is a conceptual diagram illustrating an example of a collision accident of a vehicle.
Figure 2:
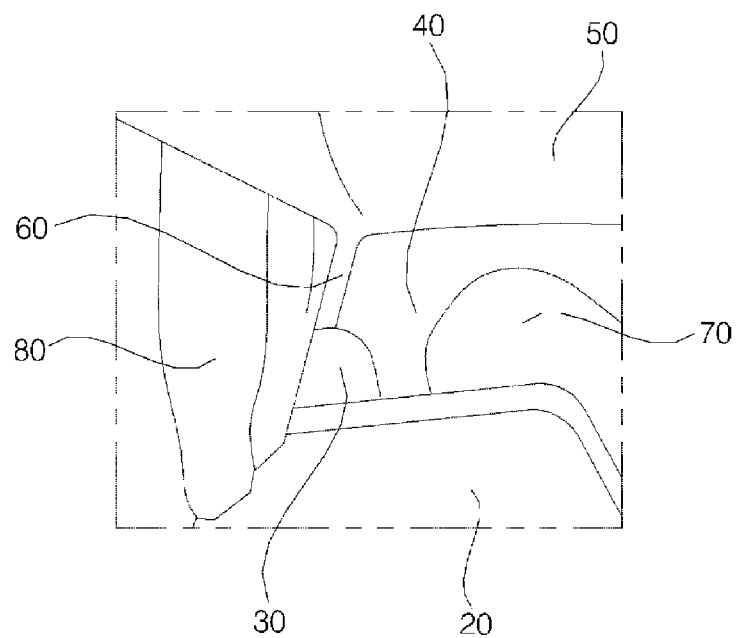
FIG. 2 is a conceptual diagram illustrating a movement of a driver seat passenger (driver) and unfolded states of various air bag modules while the collision accident according to FIG. 1 occurs.
Figure 3:
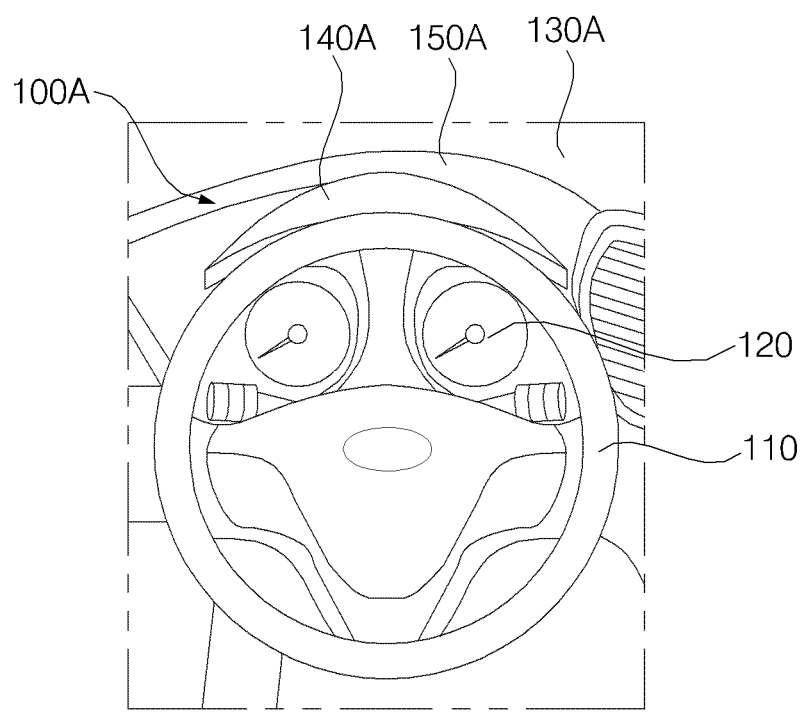
FIG. 3 is a front view illustrating a position at which an eccentric impact preventing air bag module among constituent elements of a device for protecting a passenger of a vehicle according to the present invention.
Figure 4A:
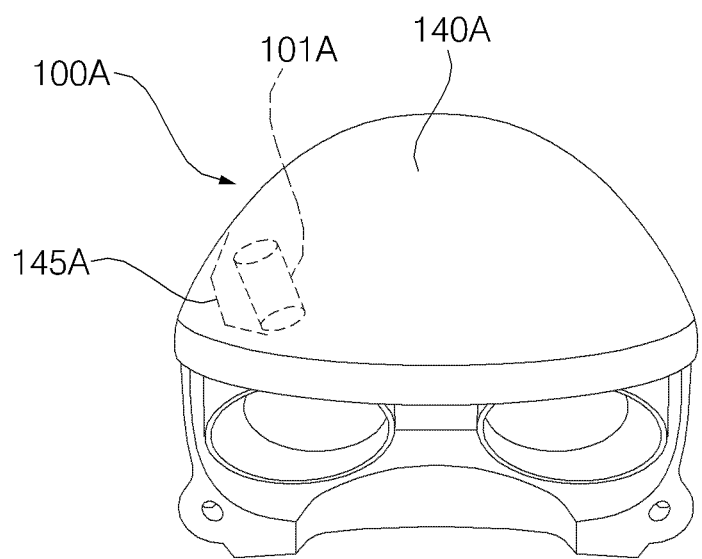
FIGS. 4A and 4B are a front view and a side view illustrating an eccentric impact preventing air bag module among constituent elements of a device for protecting a passenger of a vehicle is installed according to a first exemplary embodiment of the present invention.
Figure 4B:
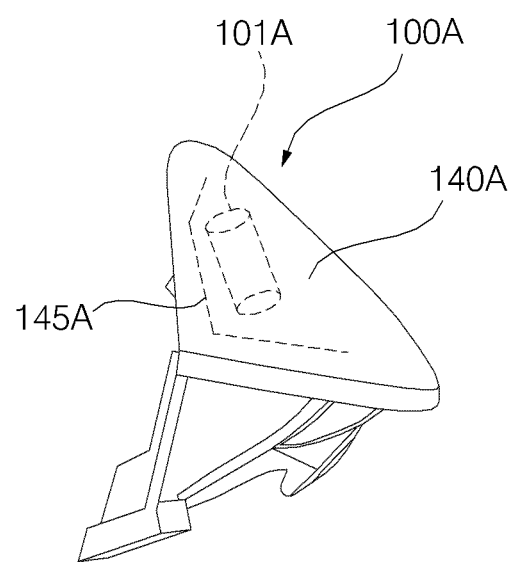

Referring to FIGS. 3 to 4B, a device for protecting a passenger of a vehicle according to the present invention includes curtain air bag (CAB) modules (not illustrated, see reference numeral 80 of FIG. 2) disposed at left and right sides of a roof panel configuring a ceiling inside the vehicle, a driver air bag (DAB) module (not illustrated, see reference numeral 70 of FIG. 2) disposed at a steering wheel inside the vehicle, and an eccentric impact preventing air bag module 100 disposed so that an air bag cushion 103 is unfolded toward an A-pillar 160 disposed so as to divide a windshield glass 130 disposed in a front side of the vehicle and side doors 170 disposed at lateral sides of the vehicle.

As described above, the eccentric impact preventing air bag module 100 that is one constituent element of the device for protecting a passenger of the vehicle according to the present invention has the same feature in that a direction, in which the air bag cushion 103 is unfolded, is toward the A-pillar 160 in various exemplary embodiments, but may be implemented in various exemplary embodiments, which is to be described below, according to an installation position thereof.

Below, a configuration in which the eccentric impact preventing air bag module 100 is installed in a cluster housing 140A provided to be exposed to the outside so as to be discriminated from a dashboard panel 150 is referred to as "a first exemplary embodiment 100A", and a configuration in which the eccentric impact preventing air bag module 100 is installed in a dashboard panel 150 because the cluster housing 140B is integrally injection molded inside the dashboard panel 150 is referred to as "a second exemplary embodiment 100B".

FIG. 3 is a front view illustrating a position at which an eccentric impact preventing air bag module among the constituent elements of the device for protecting a passenger of the vehicle is installed according to the present invention, and FIGS. 4A and 4B are a front view and a side view illustrating an eccentric impact preventing air bag module among the constituent elements of the device for protecting a passenger of the vehicle according to a first exemplary embodiment of the present invention.

The eccentric impact preventing air bag module 100A among the constituent elements of the device for protecting a passenger of the vehicle according to the first exemplary embodiment of the present invention may include an air bag cushion 103 unfolded so as to be positioned between a rear side of the DAB module and the windshield glass 130 when gas flows in, and a cluster housing 140A positioned in a front side of the DAB module and providing an installation place for indicator dials 120 of the vehicle and an installation place in which the air bag cushion 103 is inserted and installed.

As is already publicly known in general, the cluster housing 140A provides a front side of a driver's seat with a place, in which the various indicator dials 120 are installed, so as to enable a driver seat passenger to observe the indicator dials 120. Further, an upper end of the cluster housing 140A protrudes in an upper direction based on a center thereof and is formed to be rounded so as to shield or block outside natural light, and a rear end (referring to an end adjacent to the driver) of the cluster housing 140A is formed to be extended in a rear direction by a predetermined length so as to cover the indicator dials 120 from the upper side by a specific degree.

The air bag cushion 103 serves to protect the driver while being expanded when high-pressure unfolding gas generated by an inflator (not illustrated) substantially flows in. The air bag cushion 103 is configured to be accommodated in an air bag housing 101A inside the cluster housing 140A in a folded state before being unfolded, and unfolded by receiving an unfolding control signal only during a collision accident.

When the gas flows in the air bag cushion 103 so that the air bag cushion 103 is expanded, the air bag cushion 103 may be unfolded so as to cover a part of the A-pillar 160.

The A-pillar 160 will be described in detail below in order to form the scope of the device for protecting a passenger of the vehicle according to the present invention.

According to a general structure of a vehicle, the front windshield glass 130 is horizontally elongated and disposed at the front side with respect to the driver, and front left-right side doors 170 opened/closed so as to allow the driver and the passenger to get in the vehicle are provided at lateral sides. Further, a space for passengers and rear left-right side doors (not illustrated) are provided at a rear side of the driver.

Here, a constituent element of a vehicle body positioned between the front windshield glass 130 and the front side doors 170 may be defined as the "A-pillar 160", an constituent element of the vehicle body positioned between the front side doors 170 and the rear side doors may be defined as a "B-pillar (not illustrated)", and a constituent element of the vehicle body positioned between the rear side doors and a rear windshield glass (not illustrated) may be defined as a "C-pillar (not illustrated)".

In the exemplary embodiment of the present invention, the A-pillar 160 means a blind spot in which a head portion of the driver cannot be protected only with the DAB module and the CAB module when a front collision accident of the vehicle is a collision accident eccentric to one side in which the colliding vehicles horizontally overlap by a predetermined length. Particularly, it is well known that the A-pillar 160 is a divided part extended from the roof panel configuring a ceiling surface of the vehicle so as to form a boundary between the front windshield glass 130 and the front left-right side doors 170.

Here, when the gas flows in the air bag cushion 103 so that the air bag cushion 103 is expanded, the air bag cushion 103 may be unfolded so as to cover a lower part of the A-pillar 160.

In the meantime, as illustrated in FIGS. 4A and 4B, a tear line 145A torn by unfolding force of the air bag cushion 103 to induce unfolding of the air bag cushion 103 to the outside may be formed in the cluster housing 140A.

The tear line 145A may be formed so that the air bag cushion 103 is unfolded in a direction in which the front left-right side door 170 at one side of the driver seat based on the cluster housing 140A mounted in the vehicle is provided.

More particularly, a center of the upper end of the cluster housing 140A protrudes in an upper direction and is formed to be rounded as described above. Here, the tear line 145A is formed in the direction in which the front left-right side door 170 at one side of the driver seat is provided based on the center of the upper end of the cluster housing 140A, and may be formed in a shape of "⊏" toward the center of the upper end of the cluster housing 140A.

Particularly, the opened "⊏" shape may be formed so that both ends of the tear line 145A are gradually opened. Accordingly, a part corresponding to a lower side of the tear line 145A is opened in an upper direction while being torn based on both ends of the tear line 145A, and the air bag cushion 103 which is filled with gas through the opened gap is momentarily unfolded toward the A-pillar 160.

However, the eccentric impact preventing air bag module 100 among the constituent elements of the device for protecting a passenger of the vehicle according to the present invention is not limited to the implementation of the first exemplary embodiment 100A. That is, the eccentric impact preventing air bag module 100 may be implemented in the second exemplary embodiment 100B as illustrated in the drawing to be described below.

Figure 5A:
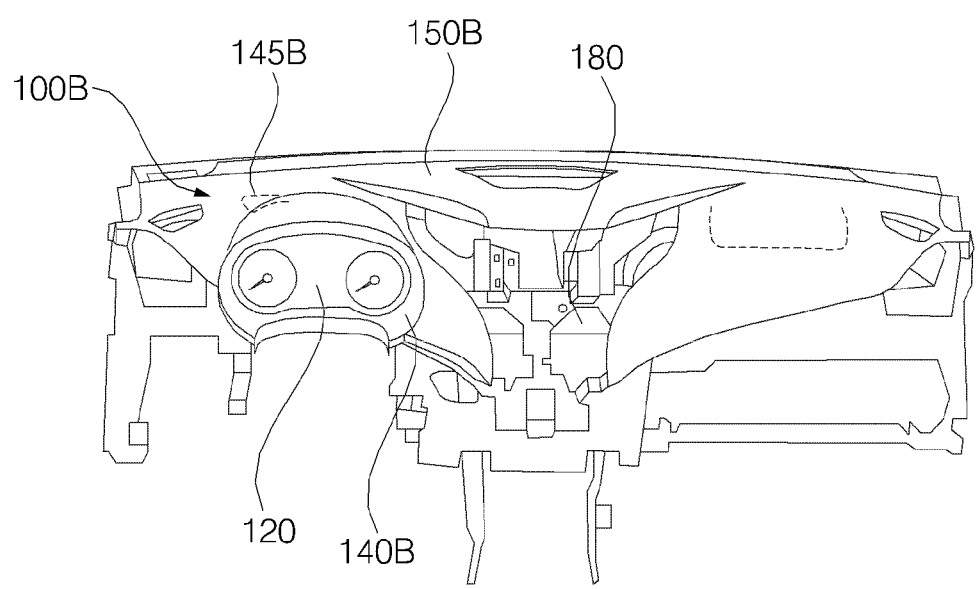
FIGS. 5A and 5B are a front view and a rear view illustrating an installation state of an eccentric impact preventing air bag module among constituent elements of a device for protecting a passenger of a vehicle according to a second exemplary embodiment of the present invention.
Figure 5B:
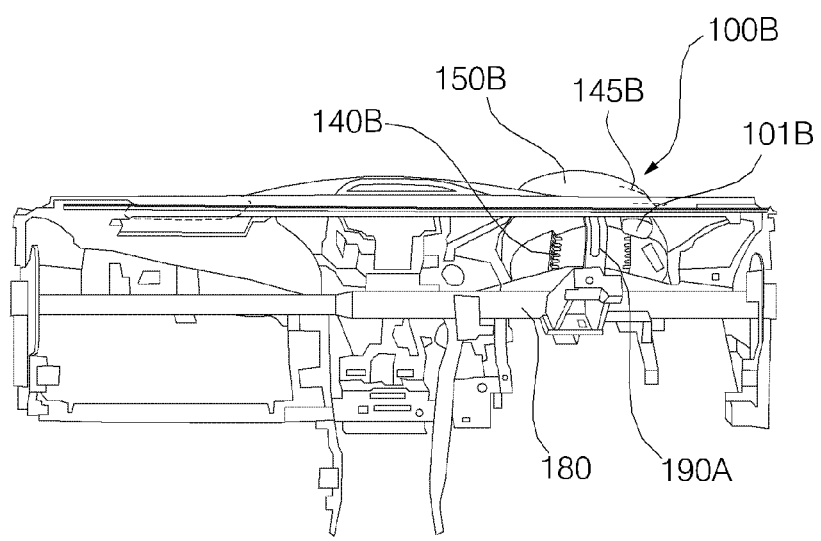
Figure 6:
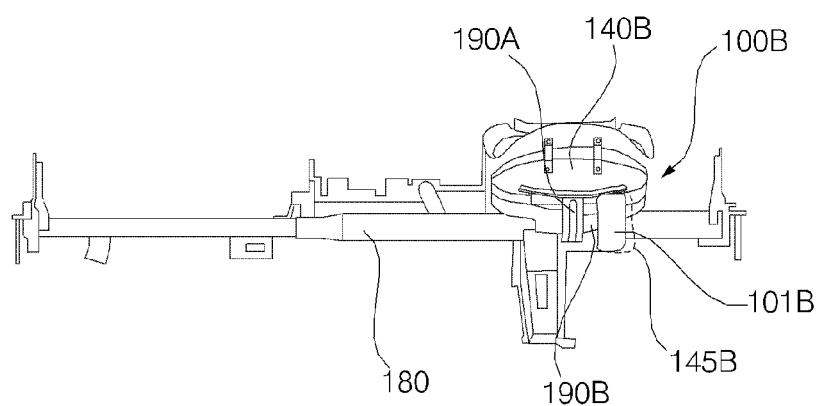
FIG. 6 is a top plan view illustrating the installation state of the eccentric impact preventing air bag module according to the second exemplary embodiment.
Figure 7:
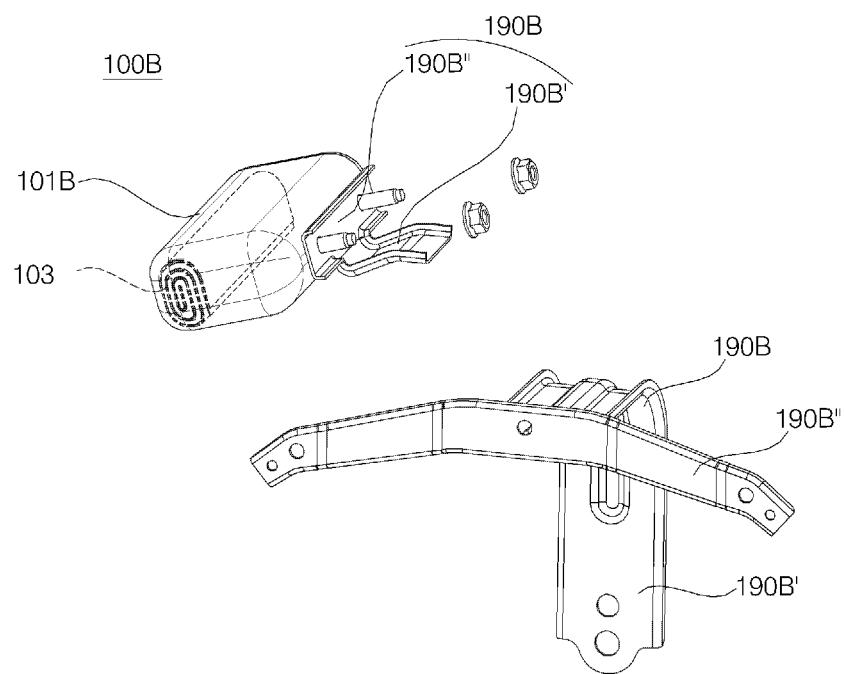
FIG. 7 is an exploded perspective view illustrating the eccentric impact preventing air bag module according to the second exemplary embodiment.

FIGS. 5A and 5B are a front view and a rear view illustrating an installation state of an eccentric impact preventing air bag module among the constituent elements of the device for protecting a passenger of the vehicle according to the second exemplary embodiment of the present invention, FIG. 6 is a top plan view illustrating the installation state of the eccentric impact preventing air bag module according to the second exemplary embodiment, and FIG. 7 is an exploded perspective view illustrating the eccentric impact preventing air bag module according to the second exemplary embodiment.

The eccentric impact preventing air bag module 100B according to the second exemplary embodiment will be described in detail based on different features from those of the eccentric impact preventing air bag module 100A according to the first exemplary embodiment.

The eccentric impact preventing air bag module 100B according to the second exemplary embodiment is mounted in the dashboard panel 150, unlike the first exemplary embodiment 100A. That is, the eccentric impact preventing air bag module 100A according to the first exemplary embodiment is installed through the cluster housing 140A, but the eccentric impact preventing air bag module 100B according to the second exemplary embodiment is installed in the dashboard panel 150, separately from the cluster housing 140B.

More particularly, referring to FIGS. 5A and 5B, the dashboard panel 150 is provided at a direct rear side of the front windshield glass 130 at the front side of the vehicle, and the cluster housing 140B is provided to be hidden inside the dashboard panel 150, except for the rear side at which the indicator dials 120 are provided. Further, as illustrated in FIGS. 5A and 5B, a cowl cross bar 180 is horizontally elongated and disposed at the front side of the driver seat of the vehicle so as to support the dashboard panel 150.

The eccentric impact preventing air bag module 100B according to the second exemplary embodiment includes the air bag cushion 103 and the air bag housing 101B which are the same as those of the first exemplary embodiment 100A. Here, the air bag housing 101B is fixed to the upper side of the cluster housing 140B and then is installed to be hidden by the dashboard panel 150 covering the cluster housing 140B.

Particularly, referring to FIGS. 6 and 7, the eccentric impact preventing air bag module 100B according to the second exemplary embodiment is coupled to a front upper portion of the cluster housing 140B through a first bracket 190A fixed to the cowl cross bar 180 and a second bracket 190B supported by the first bracket 190A.

One end of the first bracket 190A is fixed to the cowl cross bar 180, and the other end of the first bracket 190A is extended to an upper-rear direction so as to surround a part of the front portion of the cluster housing 140B to be fixed to a part of the dashboard panel 150.

One end of the second bracket 190B is supported by a center portion of the first bracket 190A, and the other end of the second bracket 190B is bolt-coupled with the air bag housing 101B through a fastening member, such as a bolt.

Similar to the first exemplary embodiment 100A, a tear line 145B torn by unfolding force of the air bag cushion 103 when gas is filled in the air bag cushion 103 so that the air bag cushion 103 is unfolded to induce unfolding of the air bag cushion 103 may be formed in the dashboard panel 150.

Here, it is a matter of course that the tear line 145B is formed in the dashboard panel 150 so that the air bag cushion 103 is unfolded in a direction in which the front left-right side door 170 adjacent to the driver seat based on the cluster housing 140B is provided.

Similar to the first exemplary embodiment 100A, the tear line 145B may be formed in a shape of "ㄱ" opened in a direction opposed to the unfolding direction of the air bag cushion 103. However, there is a difference in that the tear line 145A of the first exemplary embodiment 100A is formed in the cluster housing 140A, but the tear line 145B of the second exemplary embodiment 100B is formed in the dashboard panel 150.

Figure 8:
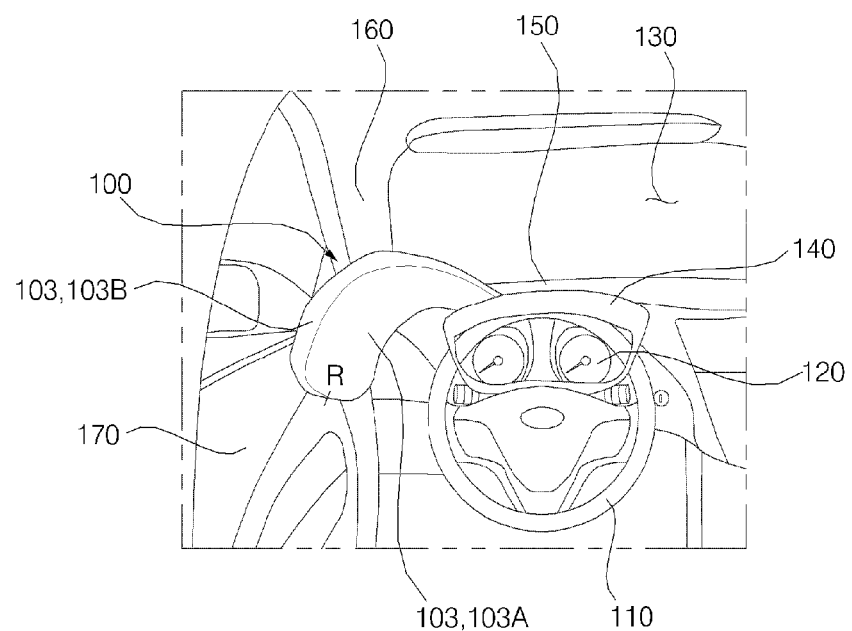
FIG. 8 is a front view illustrating an operation state of the device for protecting a passenger of the vehicle according to the present invention.
Figure 9:
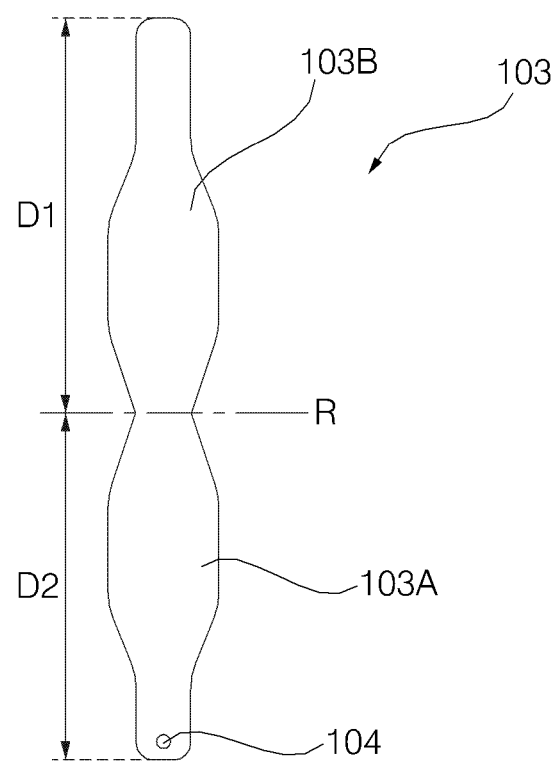
FIG. 9 is a top plan view illustrating an air bag cushion among the constituent elements of the device for protecting a passenger of the vehicle according to the present invention.

FIG. 8 is a front view illustrating an operation state of the device for protecting a passenger of the vehicle according to the present invention, and FIG. 9 is a top plan view illustrating the air bag cushion among the constituent elements of the device for protecting a passenger of the vehicle according to the present invention.

In the case where an eccentric collision accident among the kinds of front collision accident of a vehicle occurs, when the eccentric impact preventing air bag module 100 according to the first exemplary embodiment and the second exemplary embodiment including the aforementioned configuration, as illustrated in FIG. 8, is filled with gas according to inflow of the gas, the eccentric impact preventing air bag module 100 is unfolded through the aforementioned tear line 145, and is unfolded to be rounded in a direction of the driver seat where the driver sits, thereby serving as a means effectively protecting a driver seat passenger.

To this end, the air bag cushion 103 includes a front part 103A configuring a front portion so as to be in direct contact with the A-pillar 160 after unfolding, and a rear part 103B configuring a rear part so as to be in direct contact with the head of the driver after unfolding, and border portions of the front part 103A and the rear part 103B are sewn and coupled, so that a space in which gas is filled is formed.

Here, referring to FIG. 9, the front part 103A and the rear part 103B are folded based on a predetermined reference line R and the borders of the front part 103A and the rear part 103B are sewn and coupled with each other.

More particularly, referring to FIG. 9, the front part 103A and the rear part 103B may be made of one fabric. Further, the front part 103A and the rear part 103B are folded based on the predetermined reference line R and the borders of the front part 103A and the rear part 103B are sewn and coupled with each other, and a gas supply hole 104 coupled with an inflator (not illustrated) to supply unfolding gas may be formed at a place corresponding to the rear part 103B.

The front part 103A is formed to be longer than the rear part 103B so as to be more unfolded when gas is filled inside the air bag cushion 103 (see reference numeral D1>D2 of FIG. 9). That is, when the air bag cushion 103 is unfolded, the rear part 103B is bent toward the front part 103A while portion R serves as a tether, so that the air bag cushion 103 unfolded toward the A-pillar 160 is unfolded to be generally rounded. That is, this may mean that the longest length of the front part 103A is larger than the longest length of the rear part 103B.

An operation effect of the device for protecting a passenger of the vehicle according to the present invention including the aforementioned configuration will be described below.

First, when a front collision accident of a vehicle is an accident in which vehicles eccentrically collide with each other while overlapping in one direction by a predetermined length, the air bag cushion 103 is unfolded by a supply of high-pressure gas of the inflator and unfolded to the outside while tearing the tear line 145 of the cluster housing 140A or the dashboard panel 150.

In this case, in the device for protecting a passenger of the vehicle according to the present invention, the air bag cushion 103 is sewn and coupled so that the length of the front part 103A is larger than the length of the rear part 103B. Accordingly, the air bag cushion 103 may effectively protect a driver while being unfolded so as to be rounded in the direction of the driver seat, and effectively protect the head of the driver which eccentrically moves in one direction.

According to the exemplary embodiment of the device for protecting a passenger of the vehicle according to the present invention including the aforementioned configuration, there are advantages in that it is possible to first protect a driver through the DAB module when a front collision accident of the vehicle is not an eccentric collision accident, but an actual front collision accident, and secondarily protect a driver even in the case where a front collision accident of the vehicle is an eccentric collision in which the colliding vehicles overlap by a predetermined length in one direction because the eccentric impact preventing air bag module 100 is unfolded toward the A-pillar 160, which is a blind spot for protecting a driver in the related art, thereby effectively preventing a safety accident of a driver.

The exemplary embodiments of the device for protecting a passenger of the vehicle according to the present invention have been described above in detail with reference to the accompanying drawings. However, the exemplary embodiment of the present invention is not limited by the aforementioned exemplary embodiments, and may be variously modified and implemented within the equivalent scope by those skilled in the art. Accordingly, the scope of the present invention shall be defined by the accompanying claims.

What is claimed is:

1. A device for protecting a passenger of a vehicle, comprising:
    curtain air bag (CAB) modules disposed at left and right sides of a roof panel inside the vehicle;
    a driver air bag (DAB) module disposed at a steering wheel inside the vehicle; and
    an eccentric impact preventing air bag module disposed to be unfolded toward an A-pillar disposed so as to divide a windshield glass disposed at a front side of the vehicle and side doors disposed at lateral sides of the vehicle,
    wherein the eccentric impact preventing air bag module is disposed between the DAB module and the windshield glass,
    wherein the eccentric impact preventing air bag module includes:
    an air bag cushion filled with gas, and unfolded between the DAB module and the windshield glass; and
    an air bag housing in which the air bag cushion is accommodated, and the air bag housing is fixed to an upper side of a cluster housing, in which an indicator dial of the vehicle is installed, and then is hidden by a dashboard panel covering the cluster housing.

2. The device of claim 1, wherein a cowl cross bar is horizontally elongated and disposed at the front side of the driver seat in the vehicle so as to support the cluster housing and the dashboard panel, and the eccentric impact preventing air bag module is coupled to a front upper portion of the cluster housing through a first bracket fixed to the cowl cross bar and a second bracket supported by the first bracket.

3. The device of claim 2, wherein one end of the first bracket is fixed to the cowl cross bar, and the other end of the first bracket is extended so as to surround a part of a front portion of the cluster housing to be fixed to the dashboard panel.

4. The device of claim 3, wherein one end of the second bracket is supported by the first bracket, and the other end of the second bracket is bolt-coupled with the air bag housing.

5. The device of claim 4, wherein a tear line torn by unfolding force of the air bag cushion to induce unfolding of the air bag cushion is formed in the dashboard panel.

6. The device of claim 5, wherein the tear line is formed so that the air bag cushion is unfolded in a direction in which the side door adjacent to a driver seat based on the cluster housing is provided.

7. The device of claim 5, wherein the tear line is formed in the dashboard panel in a shape of "ㄷ" opened in a direction opposite to an unfolding direction of the air bag cushion.

8. The device of claim 1, wherein the air bag cushion is unfolded so as to cover a part of the A-pillar when filled with gas.

9. The device of claim 1, wherein the air bag cushion is unfolded so as to cover a lower part of the A-pillar when filled with gas.

10. A device for protecting a passenger of a vehicle, comprising:

curtain air bag (CAB) modules disposed at left and right sides of a roof panel inside the vehicle;

a driver air bag (DAB) module disposed at a steering wheel inside the vehicle; and an eccentric impact preventing air bag module disposed to be unfolded toward an A-pillar disposed so as to divide a windshield glass disposed at a front side of the vehicle and side doors disposed at lateral sides of the vehicle, wherein the eccentric impact preventing air bag module is disposed between the DAB module and the windshield glass, wherein the air bag cushion has:

a front part configuring a front portion so as to be in direct contact with the A-pillar after the unfolding; and a rear part configuring a rear portion so as to be in direct contact with a head of a driver after the unfolding, and border portions of the front part and the rear part are sewn and coupled with each other.

11. The device of claim 10, wherein the air bag cushion is formed to have a longest length of the front part larger than a longest length of the rear part.

* * * * *